(12) United States Patent
Heanue

(10) Patent No.: US 6,707,961 B1
(45) Date of Patent: Mar. 16, 2004

(54) OPTICAL CROSS-CONNECT SWITCH WITH DECREASED POLARIZATION-DEPENDENT LOSS

(75) Inventor: John Heanue, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/252,486

(22) Filed: Sep. 23, 2002

(51) Int. Cl.[7] .............................. G02B 6/27; G02B 6/35
(52) U.S. Cl. ............................ 385/18; 385/11; 385/16; 385/17
(58) Field of Search ................................ 385/15–18, 11

(56) References Cited

U.S. PATENT DOCUMENTS

| | | | |
|---|---|---|---|
| 6,429,976 B1 | * 8/2002 | Yamamoto et al. | 359/641 |
| 2001/0016096 A1 | * 8/2001 | Feldman et al. | 385/17 |
| 2001/0043386 A1 | * 11/2001 | Daneman et al. | 359/290 |
| 2002/0122619 A1 | * 9/2002 | Sandler et al. | 385/17 |
| 2002/0146197 A1 | * 10/2002 | Yong | 385/17 |
| 2002/0164113 A1 | * 11/2002 | Rensing et al. | 385/18 |

* cited by examiner

*Primary Examiner*—John D. Lee
*Assistant Examiner*—Daniel Valencia
(74) *Attorney, Agent, or Firm*—Guerin & Rodriguez, LLP; William G. Guerin

(57) ABSTRACT

Described is an optical cross-connect switch having substantially reduced polarization dependent loss in comparison to conventional optical cross-connect switches. The switch includes a first mirror array and a second mirror array defining a first array plane and a second array plane, respectively. The first mirror array reflects an array of optical beams received along a first optical axis to be substantially parallel to a second axis. The first array plane defines a pair of axes orthogonal to each of the first and second optical axes. One of the pair of axes is parallel to the first array plane. The second mirror array is positioned to receive the array of optical beams after reflection from the first mirror array such that the other of the pair of axes is parallel to the second array plane.

11 Claims, 7 Drawing Sheets

OPTICAL CROSS-CONNECT SWITCH WITH DECREASED POLARIZATION-DEPENDENT LOSS

FIELD OF THE INVENTION

The invention relates generally to optical networks. More particularly, the invention relates to an optical cross-connect switch for routing optical signals.

BACKGROUND

Optical networks generally achieve higher data rates and exhibit lower losses than their electronic counterparts. Optical cross-connect switches are often used to route optical signals between optical channels in the network. The cross-connect switches enable dynamic network requirements and improve network reliability. Some cross-connect switches utilize micro-electro-mechanical systems (MEMS) or related technologies and include an array of micro-mirrors. Each micro-mirror directs an incident input optical signal, or beam, to one of a group of output optical channels. The cross-connect switch typically includes a second mirror array to receive the reflected optical signals from a first mirror array and direct them to their respective optical channels.

In all-optical networks, it is generally desirable that the optical loss of each component be minimized. For the optical cross-connect switch, many factors contribute to the overall optical loss. Some loss contributors are functions of various parameters of the input optical signal. In particular, the polarization state of the input optical signal generally affects the optical power loss through the cross-connect switch. For example, the optical loss associated with reflection from each micro-mirror is a function of the beam angle of incidence at each mirror and the polarization state of the beam. Similarly, the optical loss associated with transmission through optical windows in the cross-connect switch is a function of the beam angle of incidence at each window and the polarization state of the beam. The variation in the output optical power represented for all possible polarization states of the input optical signal is defined as the polarization dependent loss (PDL) of the switch. It is generally desirable to reduce the PDL in order to reduce the variations in output optical power for the different switch channels or to avoid imposition of polarization control of the input beams.

The performance of optical networks is determined by the performance achieved by each of its components. Thus there remains a need for an optical cross-connect switch having reduced PDL.

SUMMARY

In one aspect, the invention features an optical cross-connect switch having a first mirror array and a second mirror array. The first mirror array and second mirror array have mirror distributions defining a first array plane and a second array plane, respectively. The first mirror array is configured to receive an array of optical beam that are parallel to a first optical axis and to reflect the array of optical beams substantially parallel to a second optical axis. The second mirror array is positioned to receive the array of optical beams after reflection from the first mirror array. The first array plane defines a pair of axes orthogonal to each of the first optical axis and the second optical axis. One of the pair of axes is parallel to the first array plane and the other is parallel to the second array plane.

In another aspect, the invention features an optical cross-connect switch having a first fold mirror, a second fold mirror and a first mirror array. The first fold mirror has a surface and is configured to receive an array of optical beams that are substantially parallel to a first optical axis and to reflect the array of optical beams substantially parallel to a second optical axis. The first fold mirror defines a pair of axes orthogonal to the first optical axis and the second optical axis. The second fold mirror has a surface and is in optical communication with the first fold mirror. The second fold mirror is configured to receive the array of optical beams from the first fold mirror and to reflect the array of optical beams substantially parallel to a third axis. One of the pair of axes defined by the first fold mirror is parallel to the surface of the first fold mirror and the other of the pair of axes is parallel to the surface of the second fold mirror. The first mirror array is in optical communication with one of the first fold mirror and the second fold mirror along one of the first optical axis and the third optical axis, respectively.

In yet another aspect, the invention features a method of reducing polarization dependent loss in an optical device. The method includes reflecting a plurality of optical beams with a first mirror array to generate a plurality of reflected optical beams substantially parallel to a first optical axis. The first mirror array has an array surface and each of the reflected optical beams has a first polarization component that is parallel to the array surface of the first mirror array and a second polarization component that is orthogonal to the first polarization component. The reflected optical beams are reflected with a second mirror array which has an array surface that is parallel to the second polarization component.

In yet another aspect, the invention features an optical cross-connect switch having a first mirror array configured to receive and reflect an array of optical beams in a first average plane of incidence. The switch also has a second mirror array in optical communication with the first mirror array and configured to receive and reflect the reflected array of optical beams in a second average plane of incidence that is perpendicular to the first average plane of incidence.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
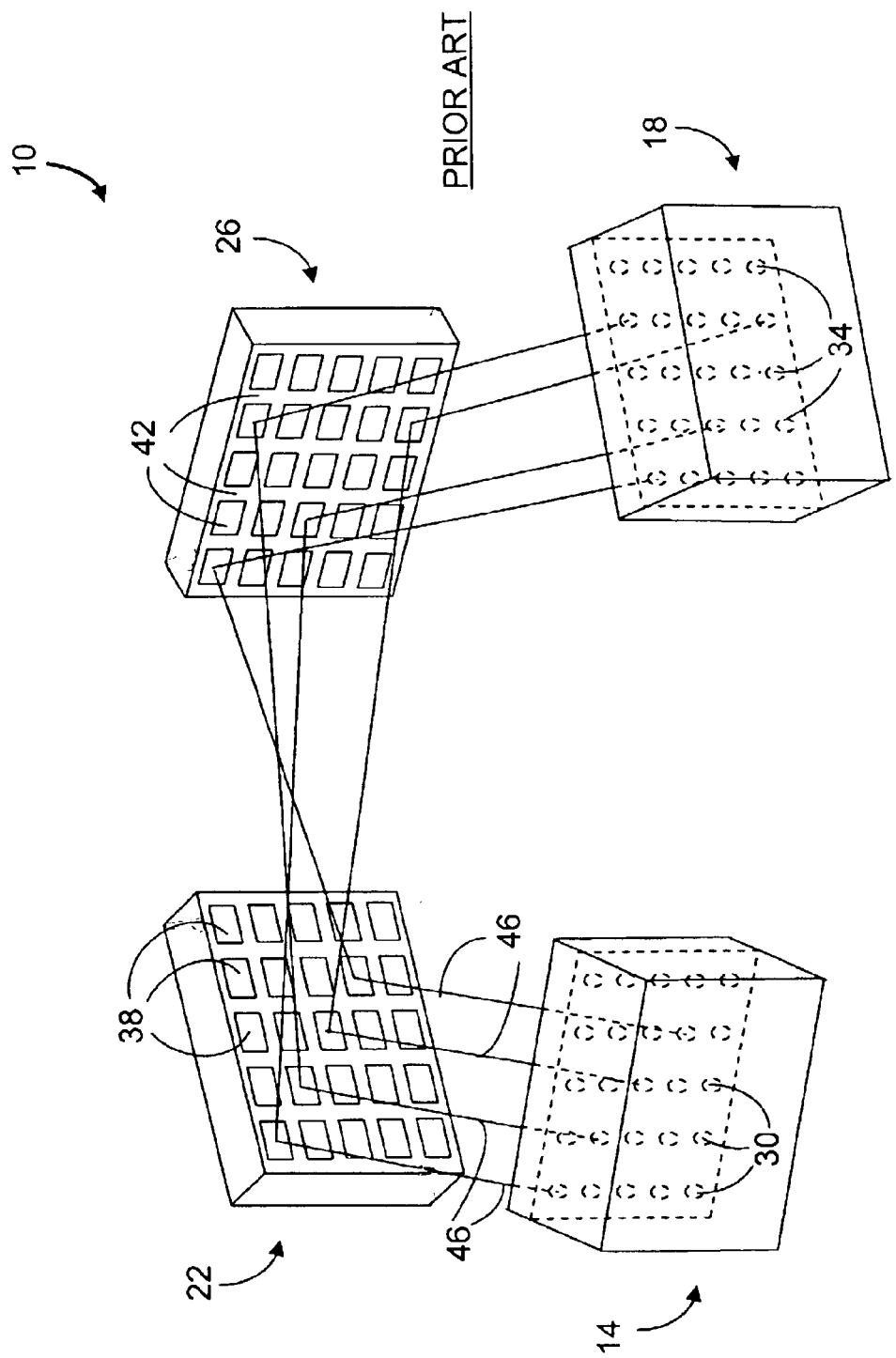
FIG. 1 is a prior art optical cross-connect switch.

Optical networks generally include switches to direct, or route, optical signals between different portions of a network. One type of optical switch is the cross-connect switch which directs each of a plurality of received input optical signals from an array of input optical channels to a selected output optical channel. FIG. 1 illustrates a typical optical cross-connect switch 10 known in the prior art. The switch 10 includes an input collimator module 14, an output collimator module 18, and a pair of micro-mirror arrays 22 and 26. The input collimator module 14 and output collimator module 18 each includes a collimator array having lenses 30 and 34, respectively (shown in phantom). The mirror arrays 22, 26 include a distribution of mirrors 38, 42 (e.g., micro-mirrors) arranged in a single plane (i.e., an array plane). Each mirror 38 in the first mirror array 22 is independently steerable according to a switch control signal and can direct its collimated beam 46 (shown as a single line, only four shown for clarity) to any one of the mirrors 42 in the second mirror array 26. Each mirror 42 in the second mirror array 26 is also independently steerable and directs its incident optical beam 46 to a corresponding collimating lens 34 in the output collimator module 18.

Each input collimator lens 30 receives a diverging optical beam from an input optical channel (not shown), such as an optical fiber, and generates a respective collimated optical beam 46. Each collimated beam 46 exiting the input collimator module 14 is incident on a corresponding mirror 38 in the first mirror array 22. The collimated beams 46 are reflected from the mirrors 38 to corresponding mirrors 42 in the second mirror array 26. Generally, the two mirrors 38, 42 that direct a single collimated optical beam 46 do not share the same array location. Instead, the actual mirror "pair" for each beam 46 is determined according to the desired coupling, or switching, between input and output optical fibers. Each collimating lens 34 generates a converging optical beam that is launched into a respective output optical fiber (not shown). Thus an optical signal transmitted through one of the input optical fibers is directed, or switched, to the desired output optical fiber according to the angular orientation of its intervening mirror 38, 42.

Figure 2:
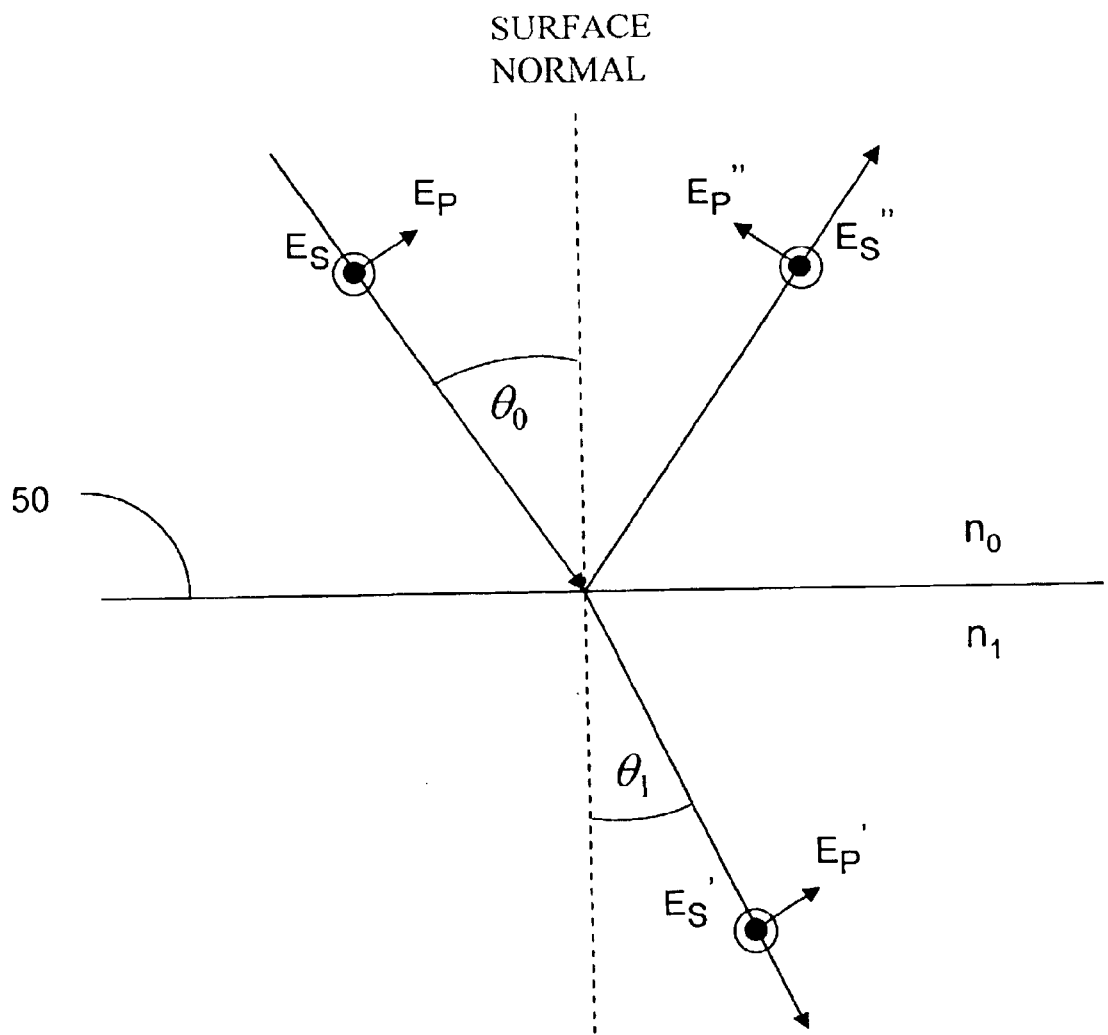
FIG. 2 is an illustration of the relationship of the electric field vectors of an optical beam at an optical interface.

Referring also to FIG. 2, the electric field vectors (i.e., E vectors) of a collimated optical beam 46 incident at an optical interface 50 defined by two different optical materials of refractive index $n_0$ and $n_1$ are shown. The interface 50 can be, for example, the surface of an anti-reflection (AR) coated window used to protect the micro-mirror array 22, 26. The plane of incidence lies in the plane of the page. The $E_S$ vector extends out of the page (i.e., parallel to the interface surface) and the orthogonal vector, $E_P$, lies in the plane of the page as indicated.

Because of the PDL introduced by the interface 50, the ratio of the optical power in the reflected beam having the polarization component $E_P"$ to the optical power in the incident beam having polarization component $E_P$ is generally different than the ratio of the optical power in the reflected beam having the polarization component $E_S"$ to the optical power in the incident beam having polarization component $E_S$. Similarly, the ratio of the optical power in the transmitted beam having polarization component $E_P'$ to the optical power in the incident beam having polarization component $E_P$ is generally different than the ratio of the optical power in the transmitted beam having polarization component $E_S'$ to the optical power in the incident beam having polarization component $E_S$. In addition, the differences in the optical power ratios vary according to the angle of incidence $\theta_0$ (or angle of transmission $\theta_S$). Although the above description is based on an interface 50 between two optically transparent materials, the same effect is noted for the reflected beams from a high reflectivity mirror (i.e., no transmitted optical energy) such as a mirror 38, 42 in a mirror array 22, 26.

Figure 3:
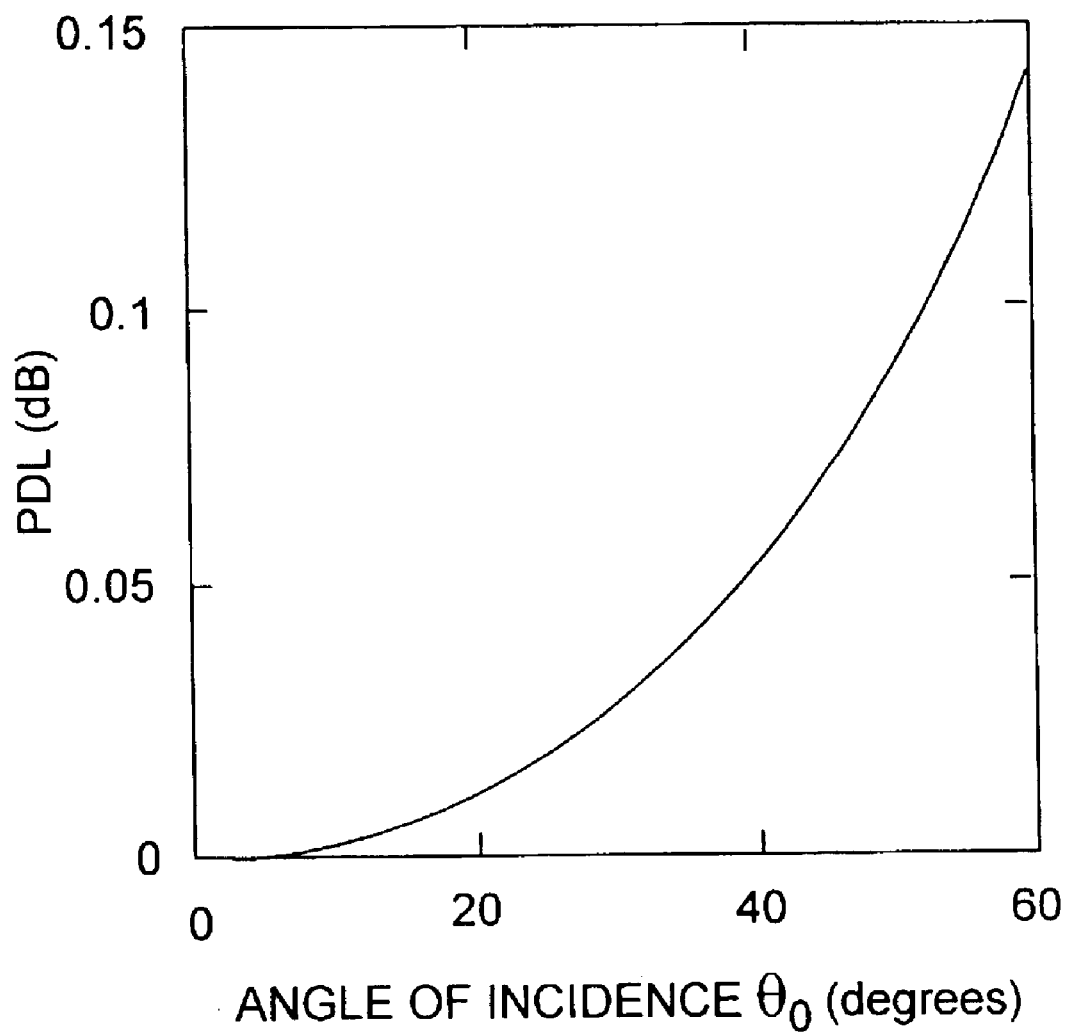
FIG. 3 is a plot of the PDL as a function of the angle of incidence of an optical beam at a mirror.
Figure 4:
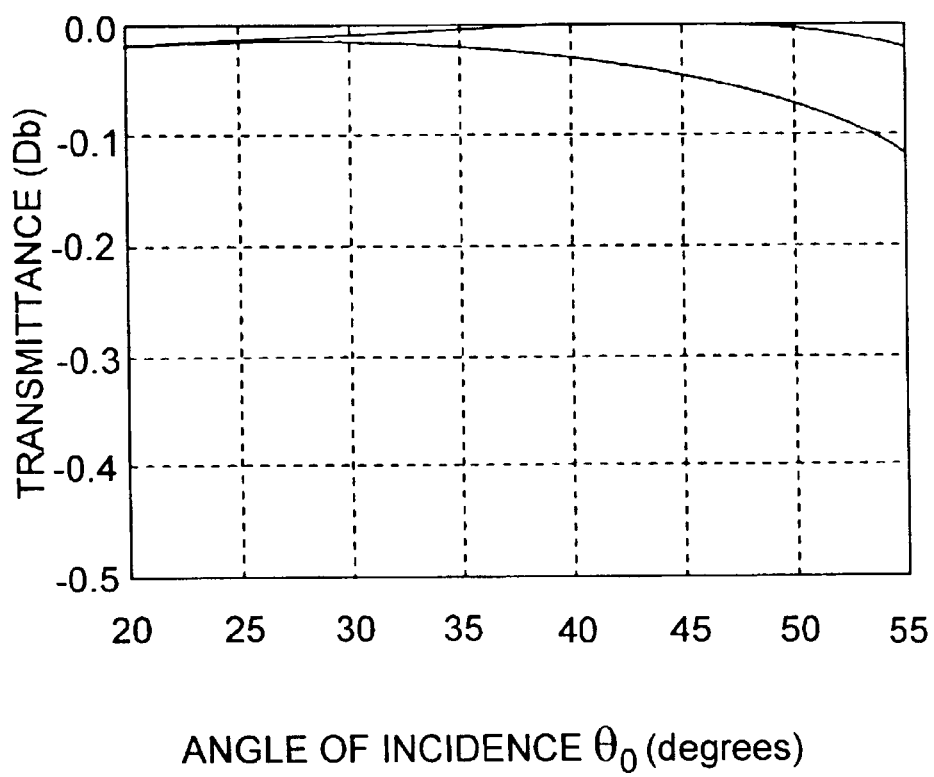
FIG. 4 is a plot of the transmittance of a typical four-layer anti-reflection coating as a function of the angle of incidence for both S and P polarizations.

FIG. 3 shows a plot of the PDL for a typical gold coated mirror 38, 42 as a function of the angle of incidence $\theta_0$. The horizontal axis represents the angle of incidence $\theta_0$ in degrees and the vertical axis represents the PDL in decibels. The PDL increases for increasing angles of incidence $\theta_0$. Additional PDL can be introduced to the cross-connect switch 10 if a protective window is disposed over one or both micro-mirror arrays 22, 26. The protective window can be coated with an AR coating to reduce the magnitude of the optical loss, however, the AR coating typically exhibits PDL. FIG. 4 is a plot of the broadband transmittance of a typical four-layer AR coating on a BK7 optical window as a function of the angle of incidence $\theta_0$ for both S and P polarization states (also see FIG. 2). The horizontal axis represents the angle of incidence $\theta_0$ in degrees and the vertical axis represents the transmittance in decibels. The plot demonstrates the general increase in PDL (due to the difference in transmittance for the two polarization states) with increasing angle of incidence $\theta_0$. In the optical cross-connect switch 10 of FIG. 1, the PDL introduced by the second micro-mirror array 26 is comparable in magnitude to that introduced by the first micro-mirror array 22.

Figure 5:
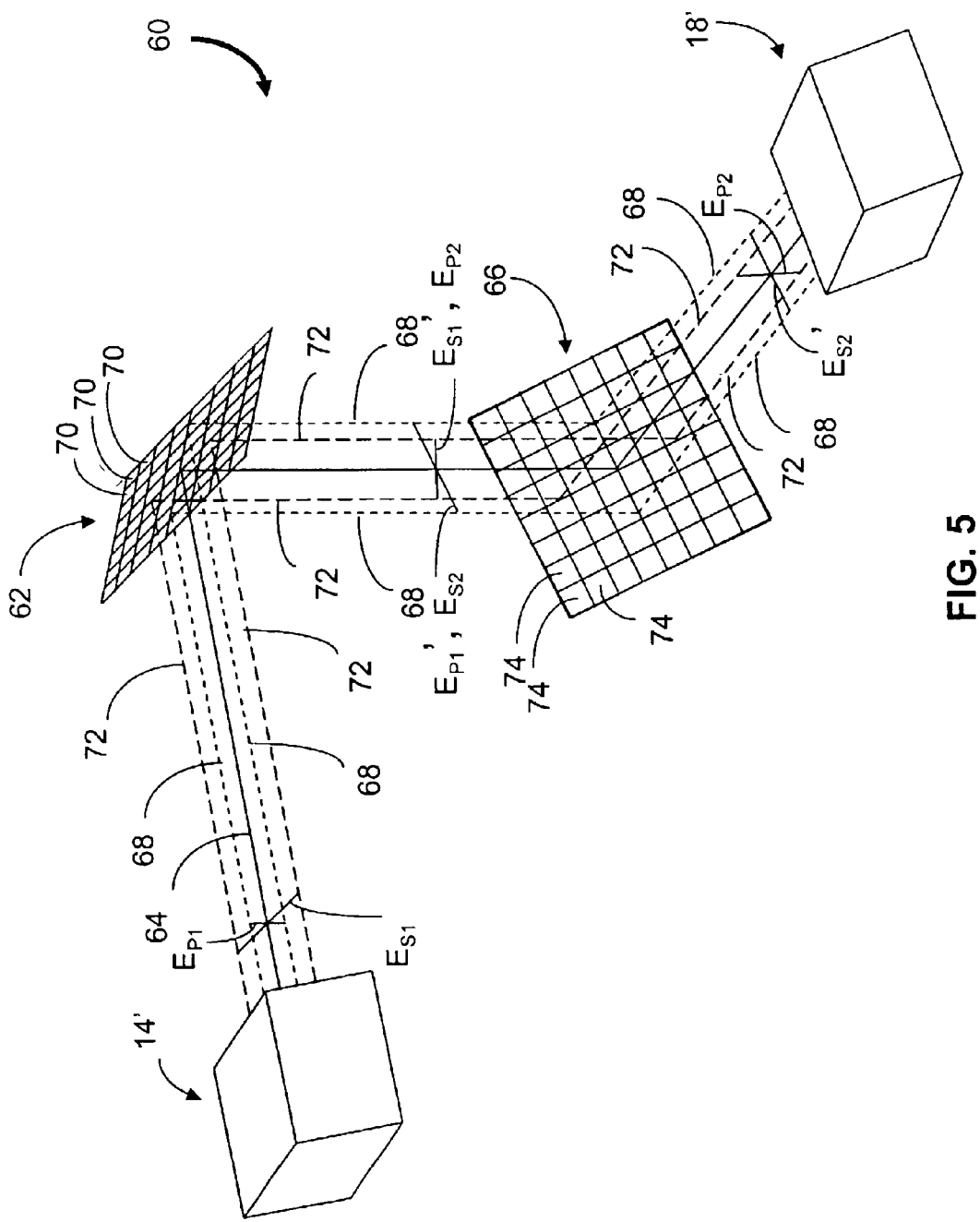
FIG. 5 is an embodiment of an optical cross-connect switch in accordance with the present invention.

FIG. 5 shows an embodiment of an optical cross-connect switch 60 in accordance with the present invention. The switch includes a non-planar arrangement of collimator modules 14', 18' and micro-mirror arrays 62, 66. Each mirror array 62, 66 includes a distribution of mirrors 70 and 74, respectively. An array of collimated optical beams propagates in parallel from the input collimator module 14' to the first micro-mirror array 62. A single optical beam representative of one of the collimated beams is depicted by a solid line 64. Short dashed lines 68 and long dashed lines 72 represent the orientation of first and second orthogonal planes of polarization (i.e., $E_{P1}$ and $E_{S1}$) respectively, for the optical beam 64 as it propagates through the cross-connect switch 60. The micro-mirror arrays 62, 66 are depicted as transparent grids to better illustrate their relative location with respect to the optical beam 64.

In prior art optical cross-connect switches in which the "average" plane of incidence defined by the mirrors in the first mirror array is approximately parallel to the average plane of incidence of the second mirror array (see FIG. 1), the sense of the S and P polarizations at the mirror arrays is substantially the same. For the illustrated embodiment, however, the sense of the S and P polarizations is reversed at the second mirror array 66. That is, the $E_{S1}'$ polarization after reflection from the first mirror array 62 (i.e., the E vector that lies in the plane defined by dashed lines 72) becomes the $E_{P2}$ polarization at the second mirror array 66. Conversely, the $E_{P1}"$ polarization after reflection from the first mirror array 62 (i.e., the E vector that lies in the plane defined by dashed lines 68) becomes the $E_{S2}$ polarization at the second mirror array 66. In effect, the average plane of incidence at the first mirror array 62 is perpendicular to the average plane of incidence at the second mirror array 66. Consequently, the PDL introduced by the second mirror array 66 is opposite in sign to that introduced by the first mirror array 62. Thus the PDL introduced by the second mirror array 66 tends to cancel the PDL induced by the first mirror array 62.

During operation of the cross-connect switch 60, the mirrors 70, 74 are angularly oriented to achieve the appropriate switching between the input and output optical channels. Thus, even if the angle of incidence of the plane defined by the second mirror array 66 is equal to the angle of incidence of the plane defined by the first mirror array 62, the cancellation is generally not complete because the angle of incidence at each mirror 70, 74 is typically different. In addition, the optical coatings on the mirrors 70, 74 and any optical windows in the switch 60 typically contribute a small PDL due to variations in coating parameters during the coating process. The PDL compensation achieved according to the present invention, however, results in an optical cross-connect switch 60 having a substantially reduced PDL in comparison with conventional optical cross-connect switches.

Figure 6:
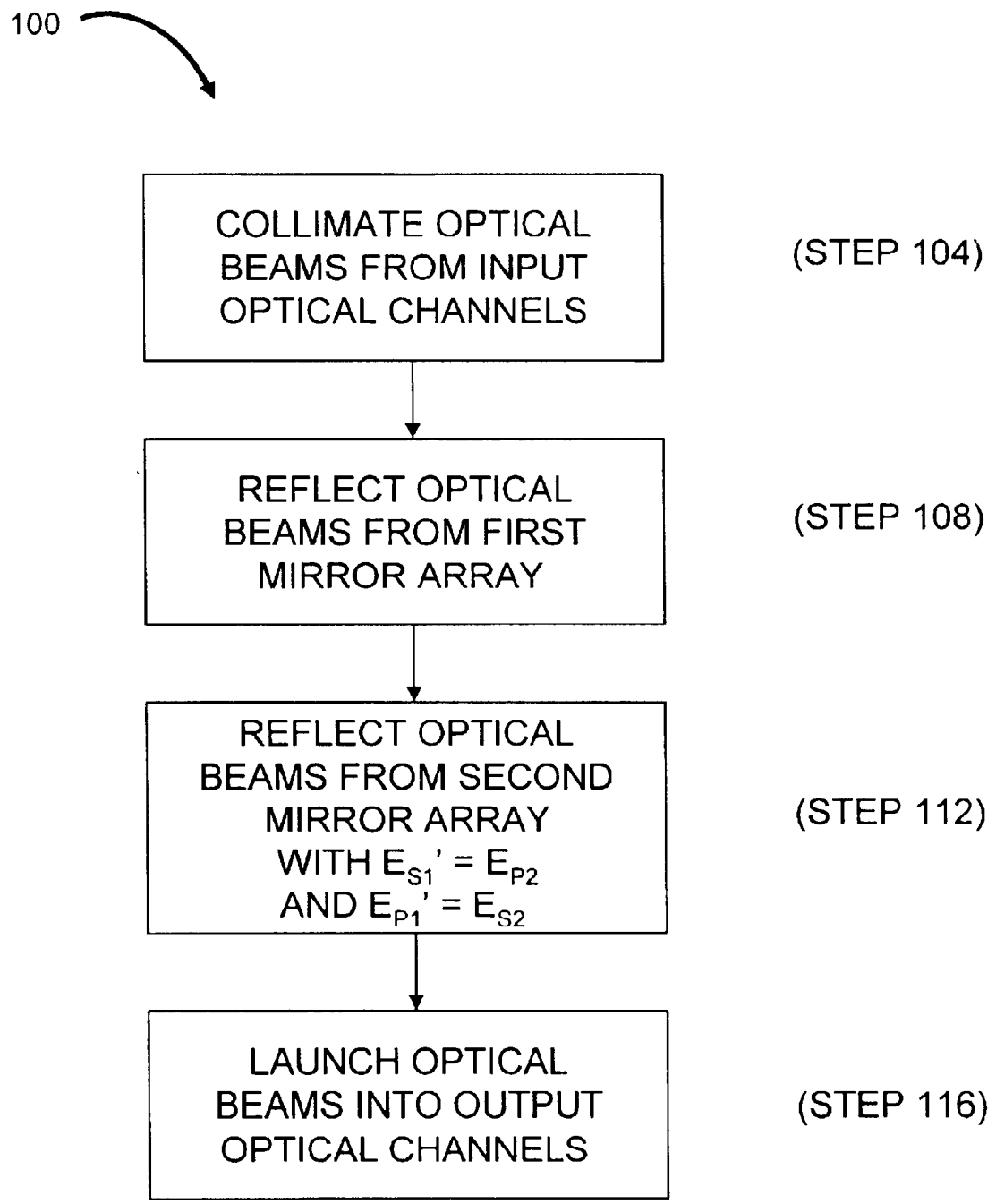
FIG. 6 is a flowchart representation of an embodiment of a method for switching an optical beam having reduced polarization dependent loss in accordance with the present invention.

FIG. 6 shows an embodiment of a method 100 for reducing polarization dependent loss in an optical device. With additional reference to FIG. 5, the method 100 includes collimating (step 104) the optical beams exiting a plurality of input optical channels (e.g., input optical fibers). The collimated beams are then reflected (step 108) with the first micro-mirror array 62 to generate reflected optical beams that are substantially parallel to a second axis defined between the centers of the two mirror arrays 62, 66. The reflected beams are generally not exactly parallel to each other due to the variations in the angular orientation of the mirrors 70 with respect to the angular orientation of the array plane defined by the distribution of mirrors 70 in the first mirror array 62. These variations are associated with the switching, or mapping, of the individual input optical channels to their respective output optical channels. The first polarization component $E_S$ is defined as the E vector that lies in a plane parallel to the average surface of the first mirror array 62. The second polarization component $E_P$ is orthogonal to the $E_S$ polarization component.

In step 112, the beams with polarization components $E_S'$ and $E_P'$ are reflected from the second mirror array 66. The second mirror array 66 has a relative orientation to the first mirror array 62 so that the orientation of their polarization components is switched. In other words, the $E_S'$ and $E_P'$ polarization components from the first mirror array 62 correspond to the $E_P$ and $E_S$ polarization components, respectively, defined by the second mirror array 66. After the second reflection, the optical beams are launched (step 116) into their respective output optical channels (e.g., output optical fibers). In one embodiment, the optical beams are focused into corresponding output optical fibers using an array of collimating lenses provided in the output collimating module 18'.

Figure 7:
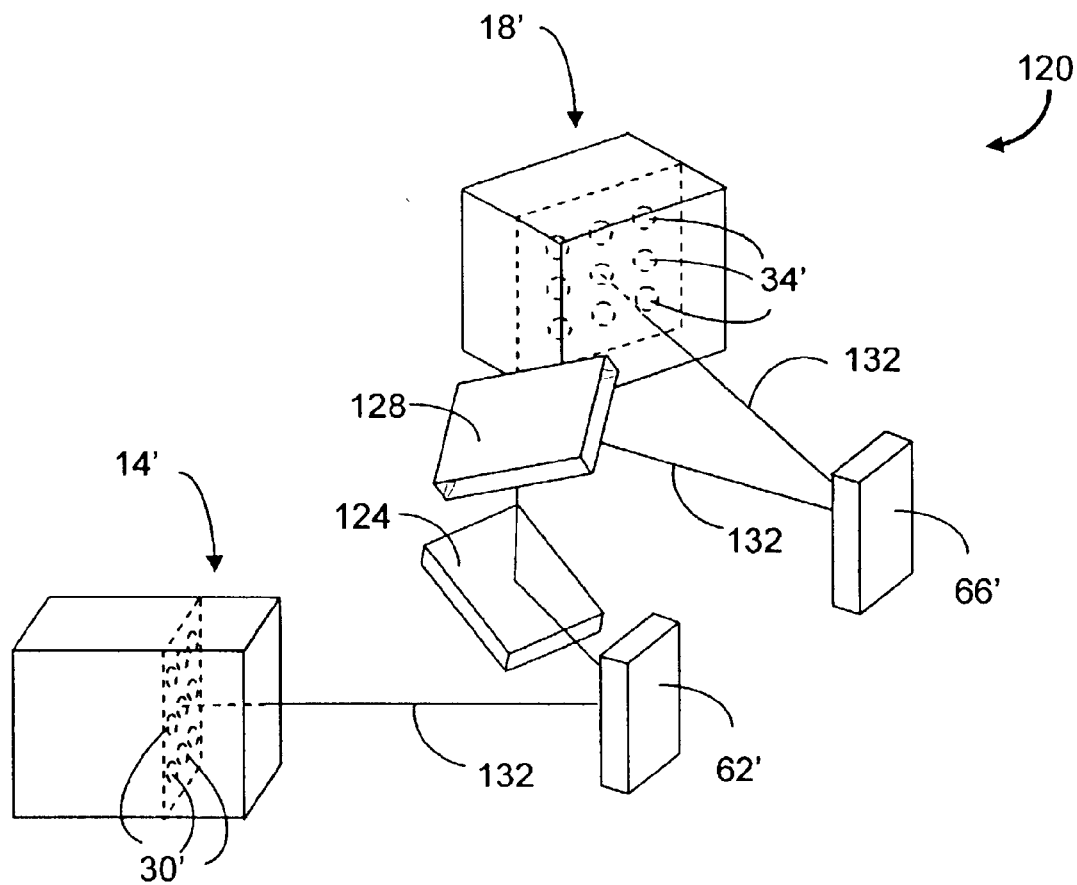
FIG. 7 is another embodiment of an optical cross-connect switch in accordance with the present invention.

FIG. 7 shows an embodiment of an optical cross-connect switch 120 according to the principles of the present invention. The cross-connect switch 120 includes an input collimator module 14', an output collimator module 18', two micro-mirror arrays 62', 66' and a pair of fold mirrors 124, 128 disposed in the optical path between the two mirror arrays 62', 66'. For clarity, a single line 132 depicts the general optical path inside the switch 120 and it should be recognized that an array of optical beams (not shown) propagates substantially parallel to line 132 during normal operation of the switch 120.

In operation, the collimated beams exiting the input collimator module 14' are incident on corresponding mirror (not shown) in the first micro-mirror array 62'. The collimated beams reflected from the first mirror array 62' are reflected by both fold mirrors 124, 128 during propagation to the second micro-mirror array 66'. The fold mirrors 124, 128 rotate the coordinate system of the optical path for each beam so that the $E_S$ vector at the first micro-mirror array 62' is the $E_P$ vector at the second micro-mirror array 66'. Similarly, the $E_P$ vector at the first micro-mirror array 62' is the $E_S$ vector at the second micro-mirror array 66'.

In the illustrated embodiment the micro-mirror arrays 62', 66' are in the same plane. This configuration provides for a more convenient placement of the collimator modules 14', 18' and associated mirror array electronics while maintaining PDL reduction over prior art cross-connect switches.

The optical cross-connect switch of the present invention is not limited to the embodiments described above. Those of ordinary skill in the art will recognize that the switch can be configured in other geometrical arrangements according to the specific application. For example, two (or more) fold mirrors can have any relative arrangement that provides the proper polarization coordinate rotation between the micro-mirror arrays. The principles of the invention can be applied to compensate for PDL introduced by other components of an optical cross-connect switch not described herein. Although the above embodiments are directed to micro-mirror arrays, it should be recognized by those of ordinary skill that the principles of the present invention also apply to arrays of mirrors of any size.

It should be understood by those skilled in the art that still other changes in form and detail may be made therein without departing from the spirit and scope of the invention as defined by the following claims.

What is claimed is:

1. An optical cross-connect switch comprising:
a first array having a minor distribution defining a first array plane, the first mirror array being configured to receive an array of optical beams that are parallel to a first optical axis and to reflect the array of optical beams substantially parallel to a second optical axis, the first array plane defining a first polarization axis and a second polarization axis for each of the first and second optical axes, the first and second polarization axes being mutually orthogonal, the first polarization axis of each optical axis being parallel to the first array plane; and
a second mirror array having a mirror distribution defining a second army plane, the second mirror array being positioned to receive the array of optical beams after reflection from the first mirror array, the second polarization axis of the second optical axis being parallel to the second array plane.

2. The optical cross-connect switch of claim 1 further comprising a first collimator array in optical communication with the first mirror array and providing the army of optical beams parallel to the first optical axis.

3. The optical cross-connect switch of claim 2 further comprising a second collimator array in optical communication with the second mirror array.

4. The optical cross-connect switch of claim 1 wherein the optical beams are collimated optical beams.

5. An optical cross-connect switch comprising:
a first fold mirror having a surface and being configured to received an array of optical beams that are substantially parallel to a first optical axis and to reflect the array of optical beams substantially parallel to a second optical axis, the first fold mirror defining a first polarization axis and a second polarization axis for each of the first and second optical axes, the first and second polarization axes being mutually orthogonal, the first polarization axis of each optical axis being parallel to the surface of the first fold mirror;
a second fold mirror in optical communication with the first fold minor and having a surface, the second fold mirror being configured to receive the array of optical beams from the first fold mirror after reflection therefrom and to reflect the array of optical beams substantially parallel to a third optical axis, the second polarization axis of the second optical axis being parallel to the surface of the second fold mirror, and a first mirror array in optical communication with one of the fist fold mirror and the second fold mirror along one of the first optical axis and the third optical axis, respectively.

6. The optical cross-connect switch of claim 5 further comprising a second mirror array in optical communication with the other of the first fold mirror and the second fold mirror along the other of the first optical axis and the third optical axis.

7. The optical cross-connect switch of claim 6 wherein the first mirror array and the second minor array are coplanar.

8. The optical cross-connect switch of claim 5 further comprising a collimator array in optical communication with the first mirror array.

9. The optical cross-connect switch of claim 6 further comprising a first collimator array in optical communication with one of the first mirror array and the second mirror array.

10. The optical cross-connect switch of claim 9 further comprising a second collimator array in optical communication with the other of the first mirror array and the second mirror array.

11. A method of reducing polarization dependent loss in an optical cross-connect switch comprising:

reflecting a plurality of optical beams with a first mirror array to generate a plurality of reflected optical beams substantially parallel to a first optical axis, the first mirror array having an array surface, each of the reflected optical beams having a first polarization component that is parallel to the array surface of the first mirror array and a second polarization component that is orthogonal to the first polarization component; and reflecting the reflected optical beams with a second mirror array, the second mirror array having an array surface that is parallel to the second polarization component.

* * * * *

UNITED STATES PATENT AND TRADEMARK OFFICE
CERTIFICATE OF CORRECTION

PATENT NO. : 6,707,961 B1
DATED : March 16, 2004
INVENTOR(S) : Heanue

It is certified that error appears in the above-identified patent and that said Letters Patent is hereby corrected as shown below:

Column 48,
Line 48, delete "army" and substitute -- array --.

Signed and Sealed this

Twelfth Day of April, 2005

JON W. DUDAS
*Director of the United States Patent and Trademark Office*